C. H. GRAY.
DRIVING BELT.
APPLICATION FILED OCT. 10, 1912.

1,129,666.

Patented Feb. 23, 1915.

Witnesses

Inventor
Christian Hamilton Gray

UNITED STATES PATENT OFFICE.

CHRISTIAN HAMILTON GRAY, OF LONDON, ENGLAND.

DRIVING-BELT.

1,129,666.  Specification of Letters Patent.  Patented Feb. 23, 1915.

Application filed October 10, 1912. Serial No. 725,031.

*To all whom it may concern:*

Be it known that I, CHRISTIAN HAMILTON GRAY, a subject of the King of England, residing at London, England, have invented certain new and useful Improvements in Driving-Belts, of which the following is a specification.

This invention relates to improvements in driving belts and is applied particularly to the flat belts commonly used for transmitting power.

The object of the invention is to provide an endless belt which shall be inextensible, flexible, strong, uniform in section and in strength and give good adhesion.

The invention consists in the process for making driving belts wherein a continuous cord is wound helically until the desired width of belt is built up, the adjacent loops being finally secured in place by embedding them in rubber and vulcanizing the whole under pressure.

In the preferred process a continuous cord is helically wound on suitably spaced rollers to form the desired width of belt, the ends of the cord are temporarily secured, the assembled loops are removed, embedded in rubber, and vulcanized under pressure. If it is desired the cord which is used to form these loops may be impregnated with rubber previous to winding it on the rollers. A canvas or like cover may, if desired, be secured on the assembled loops and vulcanized thereto.

Further features of the process of manufacture and of the belts manufactured are hereinafter described in the specification and the novel details are set forth in the claims.

Figure 1:
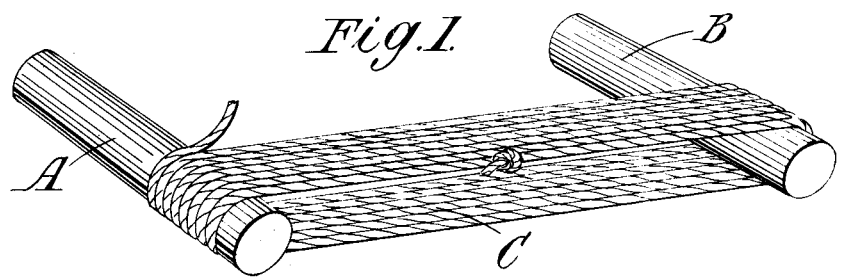
Figure 2:
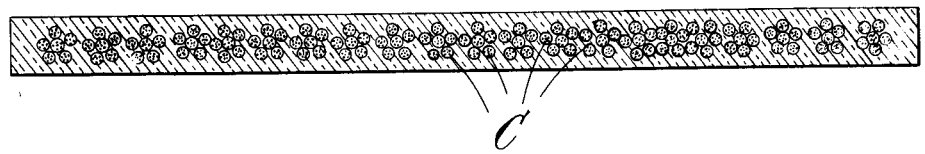
Figure 3:
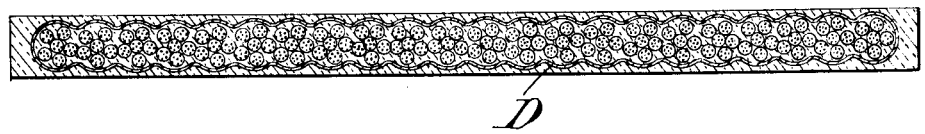
Figure 4:
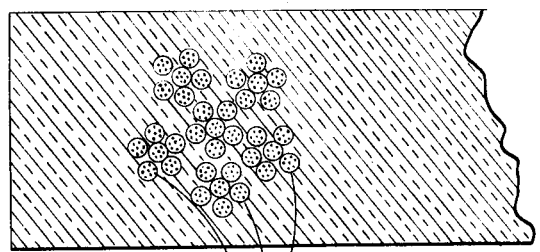

In the accompanying drawings, Figure 1 is a diagrammatic view of the belt in process of preparation. Figs. 2 and 3 show transverse sections of belts formed according to this invention. Fig. 4 is an enlarged view of a portion of a transverse section.

In making a belt according to the present invention two rollers or pulleys A and B are spaced apart such a distance that the belt when formed on them shall be of the correct length. A continuous cord C is carried once around the two rollers and knotted to itself so that there is a continuous loop of the same length as the belt. The two rollers are then revolved at the same speed and the continuous loop, in revolving draws off more of the cord and lays it helically on the two rollers until the desired width for the belt is obtained. The cord used is of any suitable kind, and in the belts illustrated in Figs. 2 to 4 consists of six strands of six yarns each twisted together in the usual manner. If it is desired the cord may be impregnated with rubber before it is wound on the rollers or it may be used plain.

In making the belt illustrated in Fig. 2 the loops are successively wound on until the desired width of belt is obtained when the cord is cut and the end temporarily secured. The whole belt is then removed and impregnated with rubber, or while it is yet in position the interstices may be filled with rubber, and the whole removed and vulcanized under great pressure. In order to give the belt a uniform section rubber is added before vulcanization in sufficient quantity to insure that when finished the belt is of uniform rectangular cross section.

In an alternative process the loops are all laid close to one another, and a canvas or like cover is secured on them as shown in Fig. 3. If it is desired, in this case also, the cord may be impregnated with rubber and the cover similarly treated and the latter secured in position by means of india rubber solution or any other convenient means. In this case or when untreated cord and cover are used, rubber is added before vulcanization as described above and the remainder of the process is the same so that a belt of uniform rectangular cross section is obtained.

What I claim as my invention and desire to secure by Letters Patent is:—

1. The method of making endless driving belts, which consists in impregnating a cord with rubber, arranging said cord into a plurality of closely-assembled convolutions, and embedding the whole in rubber and vulcanizing the same under pressure, substantially as described.

2. The method of making endless driving belts, which consists in arranging one end portion of a cord into a single loop and securing the terminal end thereof to close the same, causing said closed loop to move in an endless path and draw thereafter the cord to form a plurality of closely-assembled convolutions, securing the free end of the cord to the convoluted cord, and embedding the whole in a plastic, substantially as described.

3. The method of making endless driving belts, which consists in impregnating a cord with rubber, arranging one end portion of said cord into a single loop and securing the terminal end to close the same, causing said closed loop to move in an endless path and draw thereafter the cord to form a plurality of closely-assembled convolutions, securing the free end of the cord to the convoluted cord, filling the interstices of such convoluted cord with rubber for temporarily binding the same together, and subsequently embedding the whole in rubber and vulcanizing the same under pressure, substantially as described.

In testimony whereof I have signed my name to this specification in the presence of two subscribing witnesses.

CHRISTIAN HAMILTON GRAY.

Witnesses:
  HARRY T. DRIDGE,
  PERCY HEWITT.